Nov. 30, 1943.    M. SEYMOUR    2,335,315
DUST SEPARATING SYSTEM
Filed Jan. 10, 1941    4 Sheets-Sheet 1
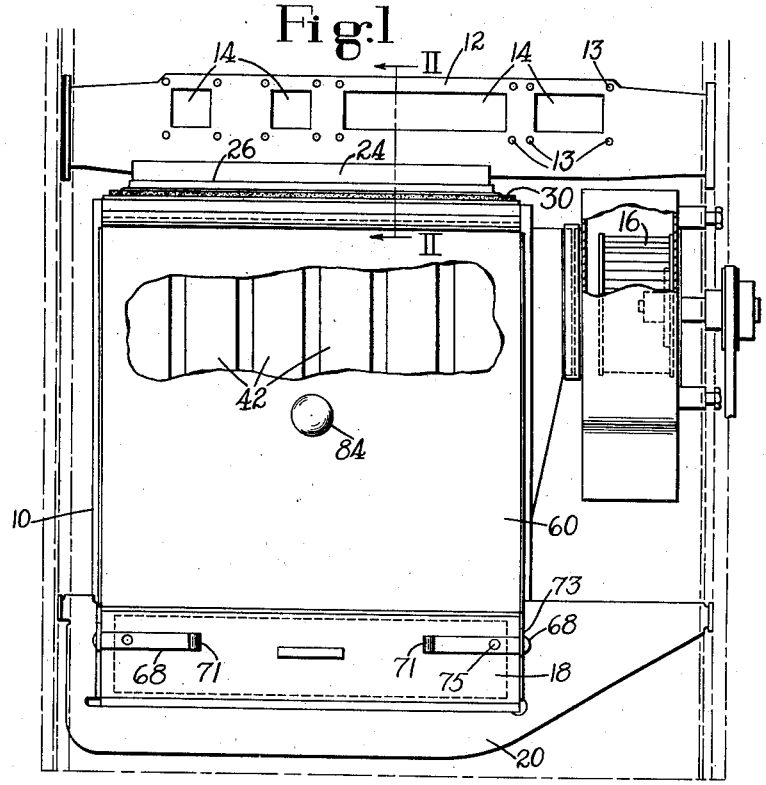
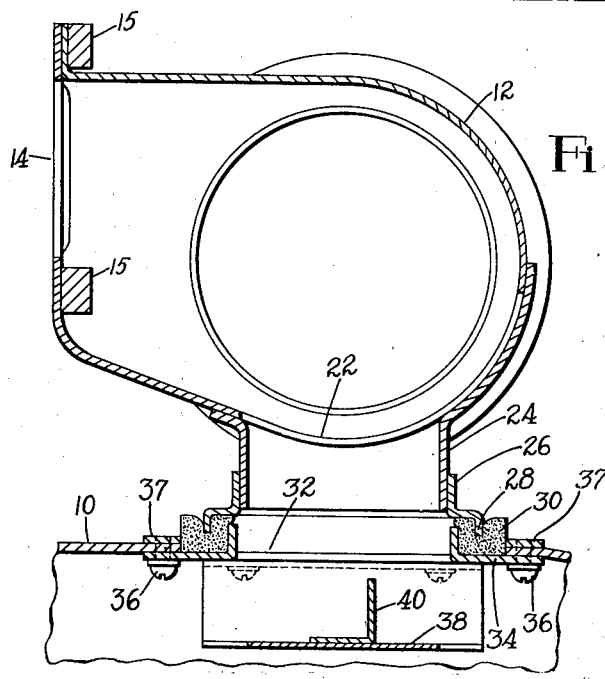

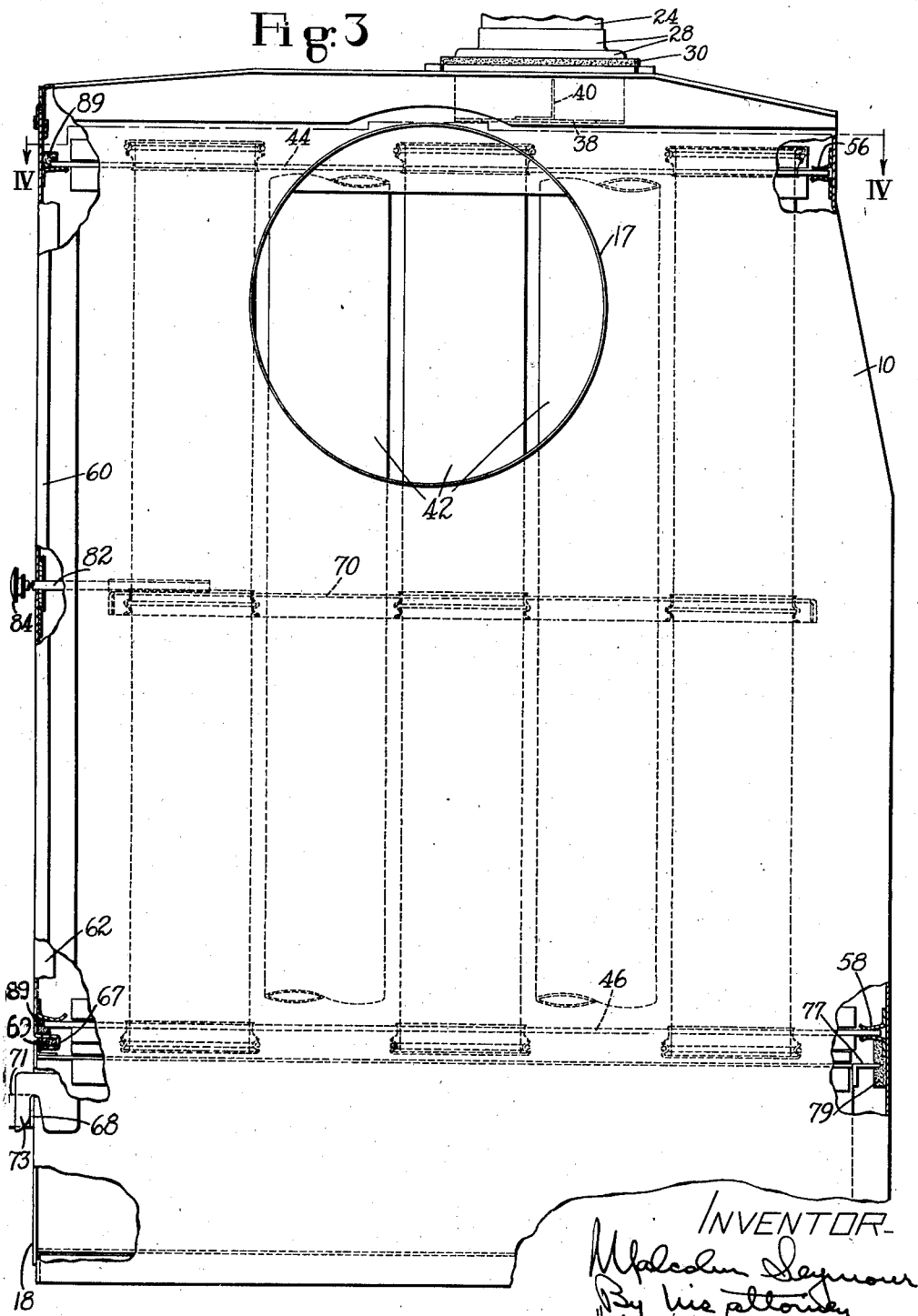

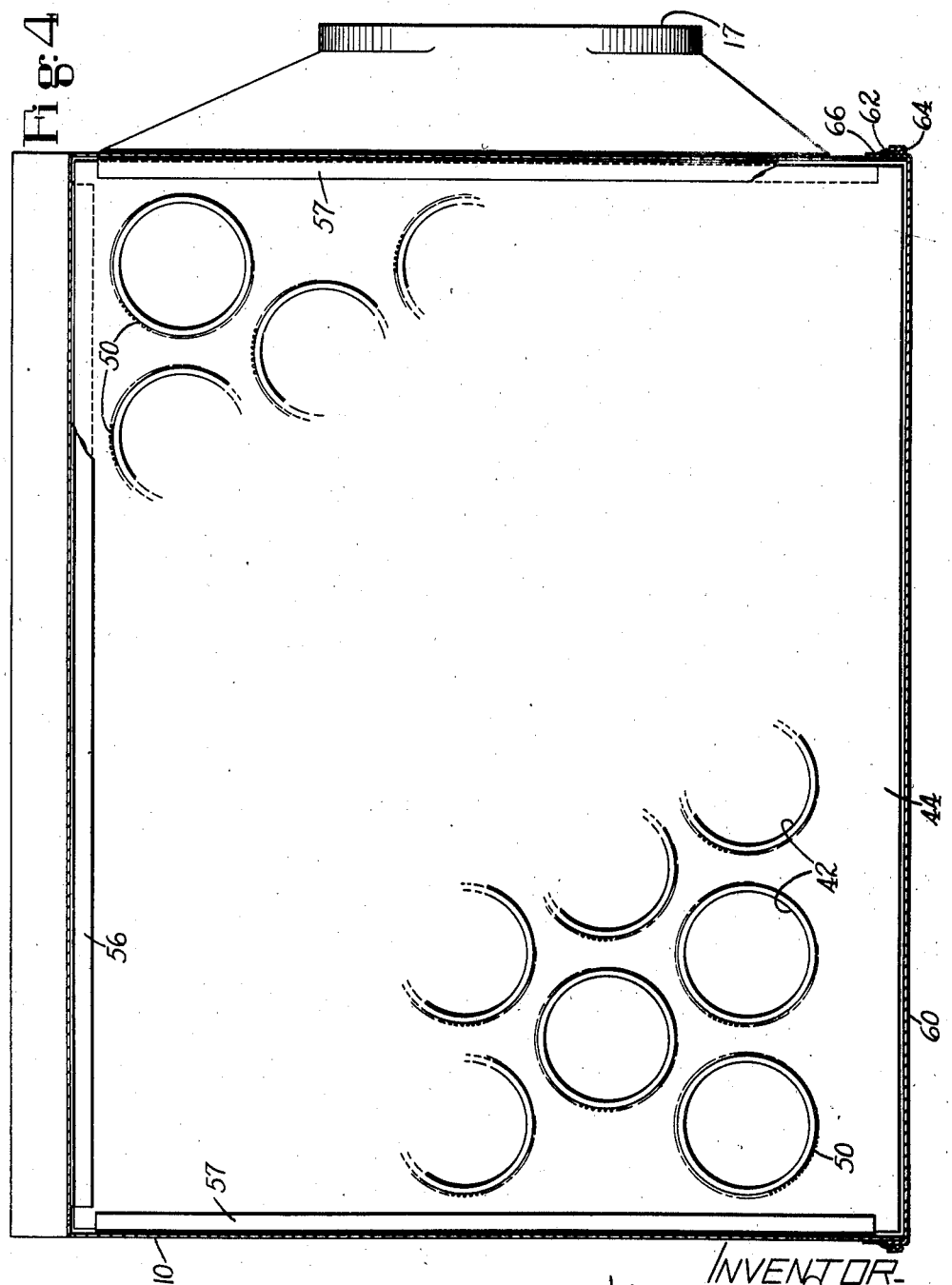

Nov. 30, 1943.  M. SEYMOUR  2,335,315
DUST SEPARATING SYSTEM
Filed Jan. 10, 1941  4 Sheets-Sheet 4
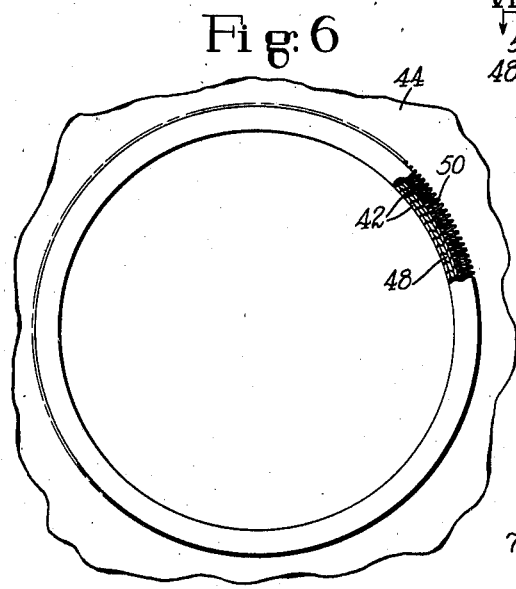
Fig. 6
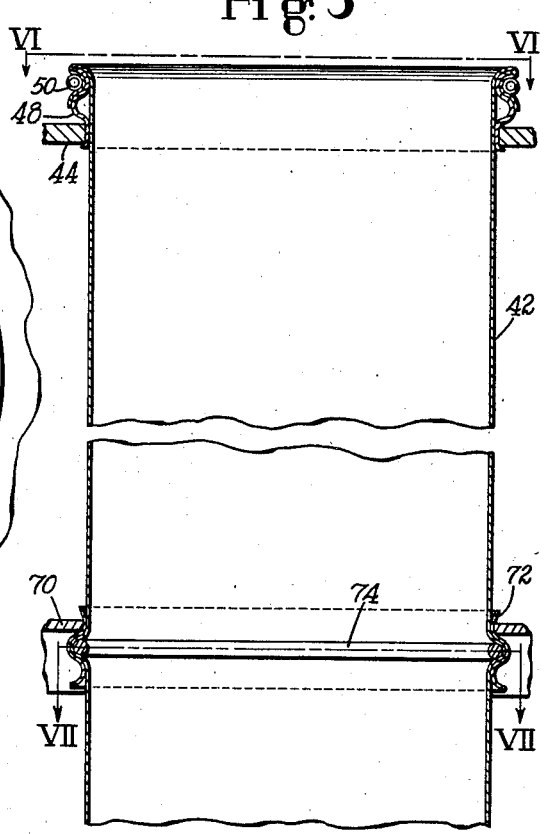
Fig. 5
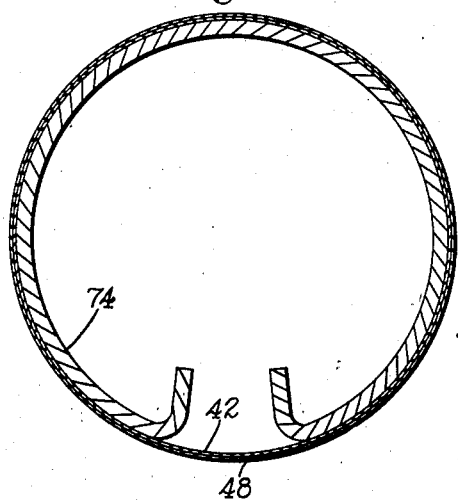
Fig. 7
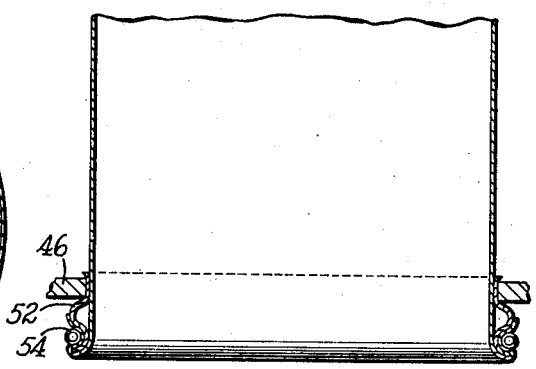
INVENTOR
Malcolm Seymour
By his attorney Patented Nov. 30, 1943

2,335,315

UNITED STATES PATENT OFFICE 2,335,315

DUST SEPARATING SYSTEM

Malcolm Seymour, Cohasset, Mass., assignor to United Shoe Machinery Corporation, Flemington, N. J., a corporation of New Jersey Application January 10, 1941, Serial No. 373,993

4 Claims. (Cl. 183—58)

This invention relates to dust separating systems and is herein illustrated and described as embodied in a dust separating system suitable for use in a shoe repair machine of the type disclosed in United States Letters Patent, No. 2,260,480, granted October 28, 1941, on the application of Frederick A. Prahl, Jr. The purpose of the apparatus disclosed herein is to remove dust from the air delivered from the various dust hoods of such a machine and to return the dust-free air into the room. It is highly desirable, for use in shoe repair machines, that the apparatus be sufficiently compact to fit within the frame of the repair machine.

It is an object of the present invention to provide a compact apparatus of the character above described. In accordance with this object, the illustrated apparatus is provided with a filter which is housed within a closed casing and which is provided with means for shaking the filter for loosening dust adhered thereto, the filter together with the shaking means being readily removable from the casing to permit the filter to be more thoroughly cleaned from time to time, or to be replaced by a new filter when necessary. Such provision for easy removal is especially important in shoe repair machines, since the operators, although skilled leather craftsmen, are often unfamiliar with machinery. The illustrated filter comprises a plurality of vertically arranged tubular screens secured to partitions which may be slid into and out of suitable supports carried by the casing. The shaking means comprises a rack carried by the screens and is therefore removable and replaceable with them.

These and other features of the invention will be described as embodied in the illustrated apparatus of the present invention.

Referring now to the accompanying drawings,

Fig. 1 is a front elevation of the dust separating system;

Fig. 2 is a detail in section taken on the line II—II of Fig. 1;

Fig. 3 is a side elevation of the apparatus shown in Fig. 1;

Fig. 4 is a sectional view in plan taken on the line IV—IV of Fig. 3;

Fig. 5 is a sectional view in elevation of one of the filter sleeves;

Fig. 6 is a plan view taken on the line VI—VI of Fig. 5; and

Fig. 7 is a sectional view taken on the line VII—VII of Fig. 5.

The dust separating system disclosed herein as shown in Fig. 1 comprises a casing or filter chamber 10 conveniently of sheet metal and adapted to receive dust-laden air from a manifold 12 having a plurality of inlet openings 14 adapted for connection to the various dust hoods which are individually associated with the several abrading tools of the machine. Metal strips 15 are welded to the sheet metal of the manifold along the lines of screw holes 13 provided for the securing of dust hoods (not shown) to the manifold. Air is drawn from the casing 10 by a fan 16 (Fig. 1) through an outlet 17 (Figs. 3 and 4) and discharged into the atmosphere, while the entrained dust is collected in a drawer 18 (Figs. 1 and 3) slidably mounted within the lower portion of the casing 10. The casing is supported by a bracket 20 (Fig. 1) which in turn is carried by the frame members of a shoe repair machine in which the apparatus is used. The manifold 12 communicates with the casing 10 through a rectangular conduit or throat member 24 (Figs. 1 and 2) which leads from an opening 22 in the manifold to an opening 32 in the top of the casing and which overlaps the manifold around the edges of the opening 22. Upon the four sides of the conduit 24 is welded a plate 26 having an offset depending flange 28 which engages a rubber strip 30 mounted around the edges of the opening 32. The rubber strip 30 is carried by a rectangular bracket 34 which is secured to the under surface of the top of the casing 10 by screws 36. Strips 37 are welded to the top surface of the casing 10 to provide for the tapping of the screw holes. In assembling the apparatus the casing 10 is first secured upon the bracket 20; the bracket 34 with the rubber strip 30 resting upon it is then placed in position and secured by the screws 36. The tightening of the screws 36 causes the rubber strip 30 to press upwardly against the flange 28 and thereby seal the connection between the casing 10 and the conduit 24. The upward thrust resulting from the compression of the rubber also causes an effective seal between the overlapping portion of the conduit and the manifold. Beneath the opening 32 and supported by the end walls of the casing 10 is a horizontal baffle plate 38 which carries a member having an upstanding flange 40, the purpose of this arrangement being to divide and distribute the current of incoming air.

The above-mentioned filter comprises a plurality of vertically disposed cylindrical sleeves 42 of a woven fabric suitable for screening dust from the air. The upper ends of the sleeves 42 are carried by a sheet-metal horizontal partition 44 (Figs. 3 and 5) while their lower ends are secured to a similar horizontal partition 46. Each sleeve 42 extends upwardly through a hole in the partition 44 and also through a ferrule 48, the upper end portion of the sleeve being turned down outside of the ferrule and being clamped around the ferrule by an annular coil spring 50. The ferrule is formed to provide an annular groove to receive the spring 50. The ferrule is also formed to provide a second annular groove which fits tightly within the hole above mentioned, the lower end of the ferrule being spun over the edge of the partition 44 around the hole to secure the ferrule firmly to the partition. The lower end portion of each sleeve is secured to the partition 46 by a similar arrangement comprising a ferrule 52 and an annular coil spring 54. When the partition 44 is in operating position, its rear edge engages a support 56 (Figs. 3 and 4) carried by the rear wall of the casing 10, and the lateral edges engage similar supports 57 (Fig. 4) carried by the lateral walls of the casing. These supports for the lateral edges serve as guideways in which the partition is mounted for sliding movement forwardly from and rearwardly into its operating position to render it readily removable and replaceable. The lower partition 46 is similarly mounted in a support 58 and in corresponding lateral guideways.

The front of the casing 10 is normally closed by a removable panel 60, the lateral edge portions of which are flanged inwardly at 62 (Fig. 4). Each of these flanged edges 62 engages a slot-like recess formed by the adjacent lateral wall of the casing 10 and a flange 64 spaced from said lateral wall and integral with a plate 66 secured to the lateral wall, the flange being thus offset to provide the recess. The upper edge of the panel 60 is not flanged but extends upwardly into a similar slot-like recess. The lower edge of the removable front panel 60 has a re-entrant flange 67 (Fig. 3) which extends within the upper edge of the forward wall of the dust drawer 18 and which carries a rubber strip 69 engageable with the inner face of said forward wall. When the dust drawer is closed, the panel 60 is thereby held in position; and the panel 60 likewise holds the partitions 44 and 46 against forward sliding movement, being provided with rubber bearing strips 89 which engage and seal the forward edges of the partitions. The upper portion of the rear wall of the dust drawer carries a flange 77 (Fig. 3) which engages a rubber sealing strip 79 on the interior of the casing 10. The dust drawer 18 is slidable in guideways carried by the lateral walls of the casing 10 and may be secured in closed position by suitable latches 68 pivoted upon pins 75 and having handles 71, said latches being engageable with hooks 73 (Figs. 1 and 3).

In order to loosen the dust which may adhere to the interior of the several filter sleeves, there is provided a horizontal rack 70 of sheet metal positioned half-way between the upper and lower partitions. This rack is not connected to the walls of the casing and is supported entirely by the filter sleeves. It is provided with suitable openings through which the sleeves pass and with a ferrule 72 secured in each opening. Each sleeve 42 is secured to its corresponding ferrule by a resilient expansion ring 74 which bears against the inner surface of the sleeve and clamps the sleeve into an annular internal groove formed in the ferrule. To facilitate shaking of the rack 70 there is secured to the forward central portion of the rack a rod 82 extending through a small opening in the front panel 60. A button 84 threaded upon the outer end of the rod 82 is grasped by the operator when he desires to impart a back-and-forth shaking movement to the rack 70 and the sleeves 42. The partitions 44 and 46 are held firmly in position by the latches 68 through the drawer 18 and the front panel 60 while the filter is being shaken.

The operation of the apparatus will be readily understood from the foregoing description. Dust-laden air from the manifold 12 enters the top of the casing 10 and is deflected both forwardly and rearwardly by the baffle 38, 40. The air then enters the tops of the several filter sleeves 42 and is drawn through the cylindrical walls of the sleeves and exhausted from the interior of the casing 10 by the fan 16. Some of the dust particles continue to move downwardly and collect in the dust drawer without touching the walls of the filter sleeves. Other dust particles strike against the inner surfaces of the sleeves and, being unable to pass through the sleeves, drop into the dust drawer or adhere to the sleeves. The dust which thus accumulates upon the inner surfaces of the sleeves is shaken loose from time to time, by the operation of the button 84, and falls into the drawer 18. When it is desired to remove the filter sleeves 42 for more thorough cleaning or for replacement, the button 84 is unscrewed from the rod 82 and front panel 60 is removed. The sleeves 42, partitions 44 and 46, and the rack 70 may then be removed as a unit. It is evident that the apparatus offers a maximum area of filtering material within a limited space thereby rendering it particularly useful in machines wherein a considerable degree of compactness is important.

Having thus described my invention, what I claim as new and desire to secure by Letters Patent of the United States is:

1. A dust separator comprising a closed casing having an inlet opening for dust-laden air and an outlet opening for dust-free air, two partitions arranged to divide said casing into an upper, a middle and a lower compartment, said inlet opening communicating with said upper compartment and said outlet opening communicating with said middle compartment, said partitions having openings for the passage of dust and air, a filter secured to said partitions and arranged to provide a free passage through said openings in the partitions from the upper to the lower compartment, said filter being arranged also to screen all air passing from the inlet to the outlet opening, and means carried by said filter for shaking the filter to loosen dust adhering thereto to enable the dust to fall into the lower compartment, said casing having a normally closed opening through which the partitions, the filter and the shaking means may be removed and replaced as a unit, and said partition-supporting means being constructed and arranged for ready removal and replacement of said partitions.

2. A dust separator comprising a closed casing having an inlet opening for dust-laden air and an outlet opening for dust-free air, two partitions arranged to divide said casing into an upper, a middle and a lower compartment, said inlet opening communicating with said upper compartment and said outlet opening communicating with said middle compartment, a plurality of filter sleeves extending heightwise between said partitions, each sleeve being secured at one of its ends to one of said partitions and at its opposite end to the other partition, each partition having a plurality of holes registering with the adjacent ends of the sleeves to provide a free passage for air and dust through the sleeves from the upper to the lower compartment, said sleeves serving to screen the air passing from the upper compartment to the outlet opening, a rack secured to said sleeves for shaking the sleeves to loosen dust adhering thereto to enable the loosened dust to fall into the lower compartment, said casing having a normally closed opening through which the partitions, the sleeves and the rack may be removed and replaced as a unit, and supports for the partitions constructed and arranged for ready removal and replacement of the partitions.

3. A dust separator comprising a closed casing having an inlet opening for dust-laden air and an outlet opening for dust-free air, two partitions arranged to divide said casing into an upper, a middle and a lower compartment, said inlet opening communicating with said upper compartment and said outlet opening communicating with said middle compartment, a plurality of filter sleeves extending heightwise between said partitions, each sleeve being secured at one of its ends to one of said partitions and at its opposite end to the other partition, each partition having a plurality of holes registering with the adjacent ends of the sleeves to provide a free passage for air and dust through the sleeves from the upper to the lower compartment, said sleeves serving to screen the air passing from the upper compartment to the middle compartment and thence to the outlet opening, said casing having a normally closed opening through which the partitions and the sleeves may be removed and replaced as a unit, and supports for the partitions constructed and arranged for ready removal and replacement of the partitions.

4. A dust separator comprising a closed casing, a plurality of substantially vertical filter sleeves within said casing, an upper and a lower partition for dividing the interior of the casing into an upper, an intermediate and a lower compartment, said filter sleeves having their upper ends secured to the upper partition and their lower ends secured to the lower partition, said casing having an inlet opening in the upper compartment for the admission of dust-laden air and having an outlet opening in the intermediate compartment for the exhaust of dust-free air, said upper partition having holes to admit dust-laden air to the filter sleeves and said lower partition having holes to permit dust to drop from the sleeves into the lower compartment, means for shaking the filter sleeves to loosen dust adhering thereto, said partitions being slidably mounted in the casing to facilitate removal and replacement of the filter sleeves, said casing having an opening through which the partitions and the sleeves may be removed, a removable panel normally closing said opening and engageable with the partitions to prevent movement of the partitions during the shaking of the filter sleeves, and readily releasable means for holding said panel in closing position.

MALCOLM SEYMOUR.